(12) United States Patent
Kellerman

(10) Patent No.: US 6,257,074 B1
(45) Date of Patent: *Jul. 10, 2001

(54) VANE ANEMOMETER WITH THERMALLY ISOLATED SENSORS

(75) Inventor: Richard Kellerman, Media, PA (US)

(73) Assignee: Nielsen-Kellerman Co., Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,460

(22) Filed: May 27, 1999

Related U.S. Application Data

(63) Continuation-in-part of application No. 09/102,888, filed on Jun. 23, 1998, now Pat. No. 5,939,645, which is a continuation-in-part of application No. 08/837,376, filed on Apr. 17, 1997, now Pat. No. 5,783,753.

(51) Int. Cl.$^7$ .................................................... G01F 1/115

(52) U.S. Cl. ............................................................. 73/861.94

(58) Field of Search ........................... 73/861.94, 170.07, 73/170.08, 861.91

(56) References Cited

U.S. PATENT DOCUMENTS

| | | | |
|---|---|---|---|
| 1,967,449 | 7/1934 | Ostman | 73/861.85 |
| 3,105,383 | 10/1963 | Cartwright et al. | 73/170.08 |
| 3,387,491 | 6/1968 | Adams | 73/170.11 |
| 3,695,106 | 10/1972 | Geisow | 73/861.92 X |

(List continued on next page.)

FOREIGN PATENT DOCUMENTS

| | | |
|---|---|---|
| 2097542 | 11/1982 | (GB) . |
| 2127972 | 4/1984 | (GB) . |

OTHER PUBLICATIONS

Brochure from JDC Instruments illustrating products believed to be commercialized prior to Apr. 17, 1997. Included within this brochure are the "Skywatch Windmeter," the "Speedwatch Surf, " and the "Skywatch Wind/Sea." Colored illustration of an accessory to JDC Instruments Speedwatch Surf and Skywatch/Sea products commercialized prior to Apr. 17, 1997, showing an impeller inserted into a holder.

*Primary Examiner*—Benjamm R. Fuller
*Assistant Examiner*—Jewel V. Thompson
(74) *Attorney, Agent, or Firm*—Woodcock Washburn Kurtz Mackiewicz & Norris LLP

(57) ABSTRACT

A portable hand-held vane anemometer is disclosed in which a modular vane assembly is removably mounted within the casing of the instrument. Within the modular vane assembly is a rotatably mounted impeller shaft. The impeller assembly preferably can be removed and inserted into a cavity of the anemometer. Consequently, if the impeller, bearings or other components of the impeller assembly should become damaged, the modular impeller assembly can be quickly and easily replaced. The vane anemometer of this invention may also measure temperature dependent environmental parameters and may also have the ability to measure these parameters relatively quickly and accurately when moving from one thermal mass to another thermal mass. These environmental parameters may include ambient temperature, wind chill, humidity and heat index. In order to determine these parameters, the vane anemometer may have a temperature probe and a humidity sensor that are disposed external to the casing. Preferably, the temperature probe and the humidity sensor are thermally isolated from the casing, so that each can respond relatively quickly when moved from one thermal mass to another. The probe and the sensor may also be disposed within one or more openings defined in the casing of the anemometer. The openings are sized large enough so as to permit enough air flow around the probe and the sensors to obtain quick and accurate readings, and small enough so as to protect the probe and the sensor from damage from mechanical forces.

41 Claims, 5 Drawing Sheets

U.S. PATENT DOCUMENTS

| | | |
|---|---|---|
| 3,713,336 | 1/1973 | Bernstein et al. ............ 73/170.08 X |
| 3,823,611 | 7/1994 | Rudow et al. .................... 73/861.85 |
| 4,078,426 | 3/1978 | Casani et al. ........................ 73/189 |
| 4,091,667 | 5/1978 | Anderson et al. ................ 73/170 R |
| 4,102,188 | 7/1978 | Simerl ......................... 73/861.85 X |
| 4,241,605 | 12/1980 | Hendriks et al. ................ 73/861.94 |
| 4,248,082 | 2/1981 | Farmer ......................... 73/861.85 X |
| 4,287,762 | 9/1981 | Baer ............................. 73/170.06 X |
| 4,463,613 | 8/1984 | Schmittner et al. .............. 73/864.94 |
| 4,548,074 | 10/1985 | Krueter ............................. 73/861.85 |
| 5,008,775 | 4/1991 | Schindler et al. .................. 361/383 |
| 5,022,766 | 6/1991 | Phipps ................................ 374/209 |
| 5,038,607 | 8/1991 | Baer et al. ........................ 73/861.85 |
| 5,105,191 | 4/1992 | Keedy ........................... 73/170.11 X |
| 5,157,841 | 10/1992 | Dinsmore .............................. 33/361 |
| 5,233,759 | 8/1993 | Gloor et al. ........................ 33/355 R |
| 5,303,578 | 4/1994 | Williams et al. .................... 73/54.24 |
| 5,361,633 | 11/1994 | Peet, II ......................... 73/861.85 X |
| 5,383,280 | 1/1995 | McDermott ............................ 33/361 |
| 5,505,082 | 4/1996 | Cushman et al. ................ 73/170.21 |
| 5,510,940 | 4/1996 | Tacklind et al. .................... 360/106 |
| 5,520,329 | 5/1996 | Clinton, III et al. .................. 236/68 |
| 5,535,619 | 7/1996 | Brookfield .......................... 73/54.33 |
| 5,558,436 | 9/1996 | Richards ............................. 374/208 |
| 5,703,777 * | 12/1997 | Buchhop et al. ............. 364/431.062 |
| 5,710,380 | 1/1998 | Talley et al. ...................... 73/861.85 |
| 5,783,753 | 7/1998 | Kellerman ....................... 73/861.94 |
| 5,939,645 * | 8/1999 | Kelleramn ....................... 73/861.94 |

* cited by examiner

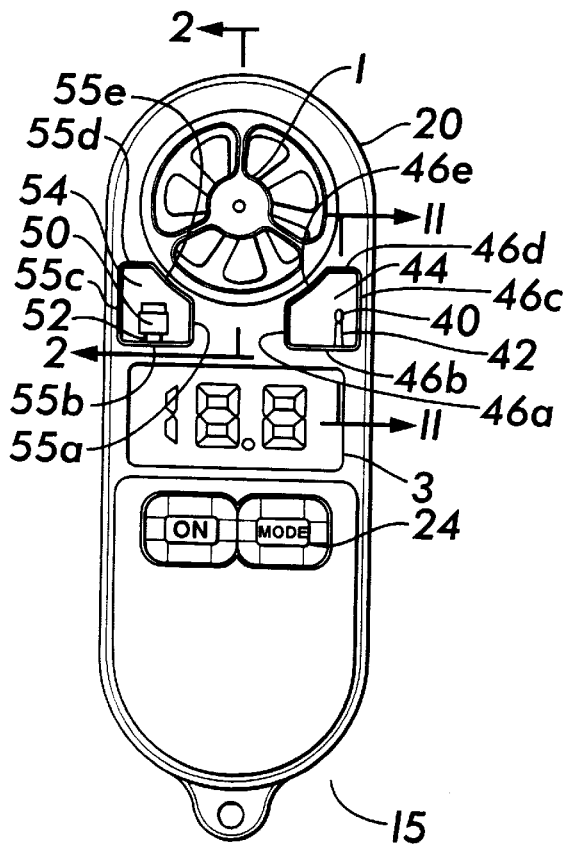
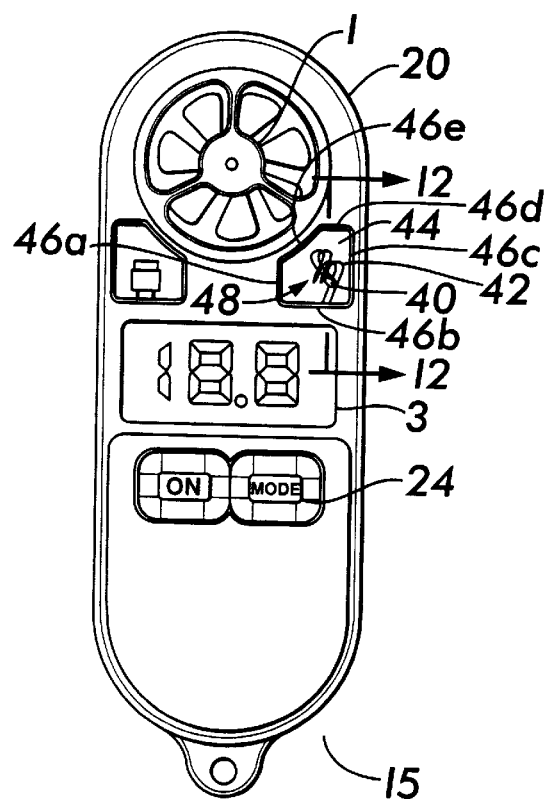
FIG.1  FIG.10
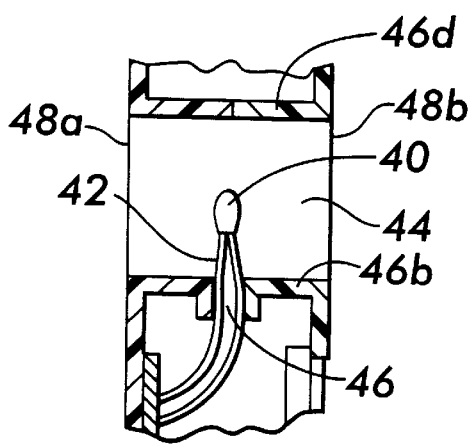
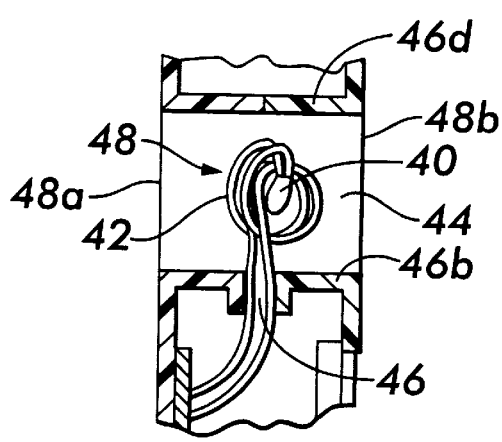
FIG.11  FIG.12

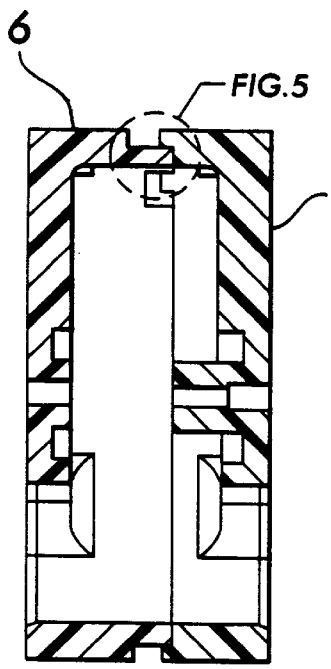
FIG.4
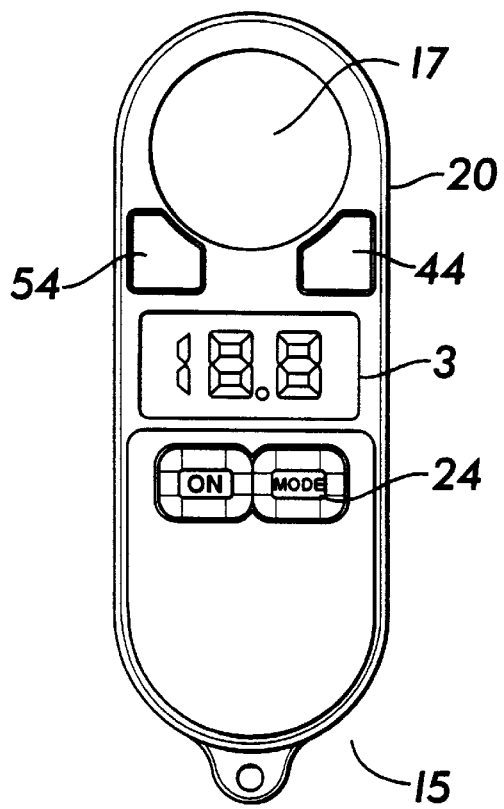
FIG.5
FIG.6

VANE ANEMOMETER WITH THERMALLY ISOLATED SENSORS

RELATED APPLICATIONS

This application is a Continuation-In-Part of U.S. patent application Ser. No. 09/102,888 filed on Jun. 23, 1998, now U.S. Pat. No. 5,939,645, which is a Continuation-In-Part of U.S. patent application Ser. No. 08/837,376 filed on Apr. 17, 1997, now U.S. Pat. No. 5,783,753 and claims the benefit of the filing date of these applications and hereby incorporates them by reference.

FIELD OF THE INVENTION

The present invention relates to portable vane anemometers intended for making air speed measurements in a variety of applications and locations with high accuracy and over a wide range of speeds. In particular, this invention relates to portable vane anemometers that have replaceable, modular impeller assemblies. This invention also relates to portable hand-held vane anemometers that can determine wind chill and/or humidity and/or heat index relative quickly when moving from one thermal mass to another.

BACKGROUND OF THE INVENTION

Conventionally, a vane anemometer has an impeller mounted on a shaft. Flow of air through the impeller produces rotation of the shaft; the speed of rotation of the shaft is indicative of the air speed. Rotation of the shaft is then measured by a known mechanical or electrical means. In many applications, vane anemometers are required to be highly accurate. If significant frictional forces are present, such as between the shaft and its bearings, some of the work produced by the air flow will be used to overcome this frictional force. Work used to overcome frictional forces will not be converted into shaft rotation. The result being that the measured speed will be less than the true air speed. Since frictional forces may be more pronounced at low speeds, the usefulness of an anemometer at low air speeds may be limited if the effects of friction are not minimized.

Typically, the effects of frictional forces are minimized by mounting the rotatable shaft in precision bearings. Since precision bearings minimize friction, the speed of rotation of the impeller shaft more closely approximates the true air speed. Frictional forces may be reduced employing sapphire "V" bearings in conjunction with hardened steel shafts having small spherically shaped tips at either of its axial ends. When the proper axial clearance is provided between the axial ends of the shaft and the bearings, the spherical tips roll around the V of the jeweled bearing and thereby reduce friction between these components. As will be appreciated by those skilled in the art, if the axial clearance is not set properly, the effects of friction will not be minimized because the shaft tips will contact the respective bearings excessively. Examples of vane anemometers using such bearings are the "TurboMeter" manufactured by Davis Instruments of Hayward, Calif., and the "Sky Watch Fun," available from Flytec USA, of Miami, Fla. or Speedtech Instruments of Great Falls, Va.

Although jewel bearings reduce friction, they have several disadvantages. For instance, one disadvantage of sapphire bearing assemblies is the tendency for the tip of the impeller shaft to suffer wear in response to the forces generated by the various loads imposed upon it. At higher wind speeds, wear can be significant and can lead to a significant degradation in accuracy. A further disadvantage of jewel bearing assemblies is vulnerability to damage caused by mechanical shock. For this reason, some companies provide such bearings with cushioned supports in order to limit shock loads. Bearings of this type are available from Bird Precision, of Waltham, Mass.

Yet another disadvantage of jewel bearings is the requirement to provide a precise axial clearance between the ends of the shaft and the bottom of the V jewel, and the necessity to provide a means to set and hold this clearance. Typically, jewel bearings are adjustable and the axial clearance is set by a skilled operator. For instance, the bearings may be threaded to the anemometer, so that, the position of the bearings relative to the shaft can be either retracted or advanced as needed. Adjustable jewels of this type are also available from Bird Precision.

One more disadvantage of jewel bearings is their susceptibly to contamination, which can also give rise to a loss of accuracy. For example, if a contaminant enters the area between the shaft end and the bearing, it will interfere with rotation of the shaft and damage the bearing. The disadvantages listed above are not limited to anemometers having jewel bearings. Ball or needle bearings are also subject to contamination, wear and damage.

If a jewel bearing or other type of bearing should fail due to either wear, mechanical shock, interference by contaminants or other causes, it will have to be either repaired or replaced. In most instances, these bearings are housed within the anemometer and are not easily accessible. Consequently, if the bearings should fail, typically the entire anemometer must be replaced. This can be expensive. Furthermore, even if the bearings are accessible, they typically cannot be replaced by the average user because replacing them involves setting the proper axial clearance as described above and requires particular skill.

The advantages of a durable vane anemometer and the disadvantage of bearings employed in anemometers are well known. The need for an anemometer that can be relatively easily repaired has also been recognized. For example, in U.S. Pat. No. 3,823,611 issued to Rudow, the advantage of an anemometer that is economically assembled and easily serviced is noted. Furthermore, in U.S. Pat. No. 4,078,426 issued to Cassini, the patentee describes a vane anemometer intended to address the problem of bearing wear and the necessity to replace the bearing one or more times during the desired useful life of the instrument.

Accordingly, it is desirable for a vane anemometer to have a bearing assembly that can easily be replaced. Furthermore, a vane anemometer that can be constructed without requiring a skilled operator to set the proper axial clearance between the bearings and the shaft is needed. An improved vane anemometer that mechanically insulates the bearings from shock loads or dynamic forces is also needed.

Devices have also been developed for determining the wind chill of the ambient air. As is known, the wind chill is a function of the wind speed and the temperature of the ambient air. Therefore, in order to determine the wind chill an instrument must detect both of these parameters.

Portable instruments, such as a portable vane anemometer, typically have a temperature sensing probe for measuring the temperature of the ambient air. One difficulty that in encountered is designing portable vane anemometers is that the temperature sensing probe is typically relatively fragile, and susceptible to damage from either static or dynamic loads. In order to protect the temperature sensing probe, prior art instruments have disposed the temperature sensing probe within the casing of the instrument. Such a device is illustrated in U.S. Pat. No. 5,008,775 (Schindler et al.) and is also exemplified in the commercially available product known as the "SILVA WINDWATCH®" which is believed to distributed within the United States by Nexus Marine, Inc.

Although disposing the temperature sensing probe within the casing of the instrument may function to protect the probe from various loading conditions, it presents other drawbacks as well. For example, portable vane anemometers are typically transported or stowed in a person's pocket, hand or other locations. Therefore, while being transported or stowed, portable vane anemometers are not at equilibrium with the ambient temperature, but rather, the temperature of the place where they are being transported or stowed, such as a person's pocket. Depending on the climate, the difference in temperature between the ambient and the storage or transporting location may be significant, and as much as 60° F. Because of this difference in temperature, when a portable instrument is removed from its storage location to the ambient, it may take a considerable amount of time for the temperature probe to reach equilibrium with the ambient. Thus, it may take a relatively long period of time to obtain an accurate temperature measurement and thus, an accurate wind chill measurement. In light of this, there is a need for a portable hand-held vane anemometer that can determine wind chill relatively quickly when moving from one thermal mass to another. It is also desired to provide a portable hand-held vane anemometer that accomplishes this while providing protection for the relatively fragile temperature sensor.

It is further desired to provide a vane anemometer that can determine a wide array of environmental parameters in addition to wind speed, air temperature and wind chill. This invention also includes a portable vane anemometer that can measure a variety of environmental parameters, such as wind chill, wind speed, humidity and heat index. Similar to determining temperature and wind chill, determining relative humidity generally involves sensors that are temperature dependent and relatively fragile. Therefore, in order to determine relative humidity is also important that a humidity sensor of a hand-held vane anemometer is thermally isolated from the anemometer casing and protected from mechanical shock. A portable vane anemometer of this type is included within this invention.

SUMMARY OF THE INVENTION

According to the present invention, a vane anemometer includes a casing and a modular impeller assembly. The vane anemometer is preferably of the portable type that can be hand-held and carried on one's person. A casing preferably defines the outer periphery of the vane anemometer.

Preferably, the modular impeller assembly has a rotatable shaft upon which is mounted an impeller. The shaft and the impeller may be mounted in a cage assembly. More particularly, the shaft may be mounted in a bearing at either of its axial ends, preferably jewel bearings. Within the casing of the anemometer may be a cavity into which the impeller assembly can be inserted and removed. Disposed within the casing may be a microprocessor that responds to rotation of the impeller to determine wind speed.

The vane anemometer of this invention can preferably measure a variety of temperature dependent environmental parameters. In order to measure these parameters, the vane anemometer may have one or more sensors, disposed external to the casing. Preferably, the sensors are each disposed within a separate opening defined in the casing. The sensors are each in electrical communication with the microprocessor, so that the microprocessor can determine the temperature dependent environmental parameters based on the measurement of the sensors.

The sensors are preferably thermally isolated from the casing, so that they can respond relatively quickly when moved from one thermal mass to another. In order to thermally isolate the sensors, they may have an electrical connector that couples the sensor to the microprocessor. The electrical connector is preferably of sufficient length, so as to thermally isolate the respective sensor from the casing. Alternatively, the electrical connector may be manufactured from a material of relatively low thermal conductivity or a combination of non-thermally conductive material and length of the connector can be used in order to provide the requisite thermal isolation.

By being thermally isolated from the casing, the sensors can respond relatively quickly to measure their respective environmental parameter when moved from one thermal mass to another. Without this thermal isolation, the casing and the sensors would tend to remain at approximately the temperature of the first thermal mass when moved to the second thermal mass, and the sensors would have to wait for the casing to obtain equilibrium with the second thermal mass in order to obtain a true reading of the parameter sensed in the second thermal mass. Since the casing is preferably constructed from plastic or another relatively non-thermally conductive material and has a relatively high thermal mass, it takes a relatively long time for the casing to reach equilibrium. In order to provide a relatively rapid response, the sensors are thermally isolated as described above.

Preferably, the openings in which the sensors are disposed are sized specifically to balance competing considerations. The openings are sized large enough to obtain an adequate amount of air flow through them. This ensures that the sensors are measuring the ambient's parameter, not just a localized air mass. The openings are also sized small enough to protect the sensors from mechanical damage. By sizing them small, the likelihood of damage from an object being inserted into the opening is reduced.

In a preferred embodiment, one of the sensors is a temperature probe and the other is a humidity sensor. By using the wind speed determined from the impeller and the temperature determined from the temperature probe, the microprocessor can determine wind chill. Further, the microprocessor can determine humidity from the humidity sensor and heat index from the temperature and the humidity sensor. Thus, the portable vane anemometer of this invention can measure a wide range of environmental parameters.

In order to insulate the impeller from mechanical shock and dynamic forces, the impeller assembly preferably has an elastomeric or other shock absorbing material running around its periphery. Within the cavity of the casing may be a groove upon which the elastomeric material can be mated. By mating the impeller assembly to the casing in this fashion, the elastomeric material provides mechanical insulation from dynamic forces. For example, if the anemometer is dropped, the sensitive components of the impeller assembly, such as the jewel bearings, are protected from mechanical shock.

In a preferred embodiment of this invention, the impeller assembly has a magnet mounted on the shaft and an inductor and a microprocessor disposed within the casing. As wind causes rotation of the impeller, the shaft and its attached magnet rotate in relation to the wind speed. Rotation of the magnet and its associated magnetic field induces a current in the inductor that is indicative of the wind speed. The current produced by the inductor is then sent to the microprocessor. Within the microprocessor, the wind speed is calculated. The wind speed may be displayed on an LCD display disposed in the casing. Furthermore, the anemometer may have a key pad arranged on the casing to control the operation of the microprocessor.

The impeller assembly may have two cages that can be mated, so that, the axial clearance between the impeller shaft and the bearings can be properly and easily established. One of the two cages may have a plurality of protrusions that can be mated with recesses on the other cage. Upon mating the protrusions with the recesses, there is little or no axial clearance between the shaft and the bearings. After mating the cages, the cages are rotated relative to one another. This causes the protrusions to exit their respective recesses. As they exit the recesses, the protrusions push against a mating surface of the other cage and thereby cause the cages to separate by a distance equal to the length of the protrusions. Upon separating the cages by the length of the protrusions, the shaft is also separated from the bearings at either end by a distance that is approximately equal to the length of the protrusions. More particularly, the sum of the distance each end is separated from its respective bearing is equal to the length of the protrusions. Thus, by selecting the proper length of the protrusions, the proper axial clearance between the ends of the shaft and the bearings can be set without the use of a skilled operator and an adjustable bearing.

Other features of the invention are descried below.

BRIEF DESCRIPTION OF THE DRAWINGS

FIG. 1 is a front view of a vane anemometer according to a preferred embodiment of this invention.

FIG. 4 is a cross sectional view taken along line 4—4 of FIG. 3;

FIG. 5 is an enlarged view of one aspect of the component depicted in FIG. 4;

FIG. 6 is a front view of the vane anemometer of FIG. 1 with the modular impeller assembly removed;

FIG. 10 is another preferred embodiment of the vane anemometer of this invention;

FIG. 11 is a cross-section taken along line 11—11 of FIG. 1; and

FIG. 12 is a cross-section taken along line 12—12 of FIG. 10.

DESCRIPTION OF PREFERRED EMBODIMENTS

Figure 2:
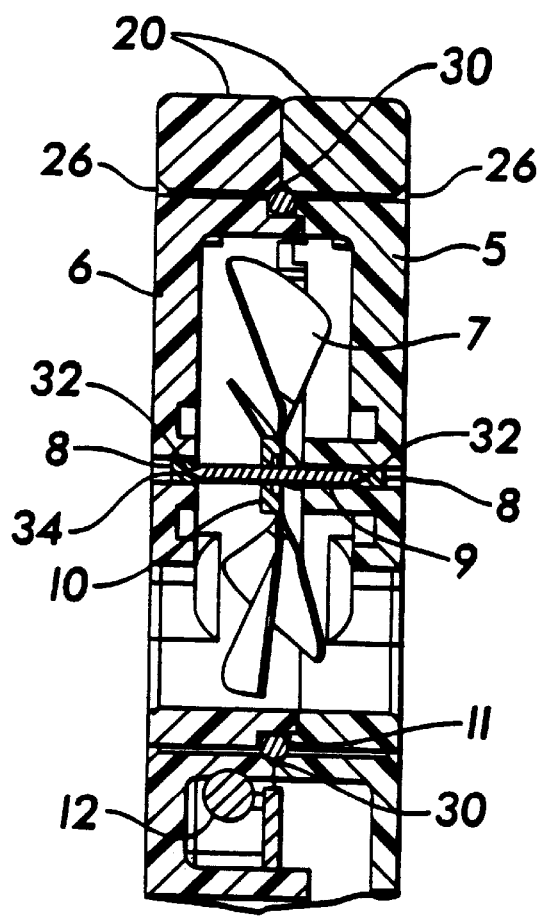
FIG. 2 is an enlarged section view through line 2—2 of FIG. 1.

Referring now to the drawings, wherein like reference numerals designate corresponding structure throughout the views, and referring in particular to FIG. 1, there is shown a vane anemometer 15. The vane anemometer 15 is preferably small enough so that it is portable and can be held in a single hand. In a preferred embodiment, the vane anemometer 15 includes a casing 20 and a removable modular impeller assembly 1. Preferably, the casing 20 is manufactured using a molding process. However, other known techniques of manufacturing may be employed. Additionally, the casing 20 is preferably constructed from plastic. Again other suitable materials may be used. As illustrated in FIG. 6, the casing 20 has a cavity 17 for receiving the modular impeller assembly 1. FIG. 1 depicts the modular impeller assembly 1 mounted in the cavity 17. Preferably, the cavity 17 and the impeller assembly 1 are substantially cylindrical in shape.

Housed within the casing may be a microprocessor and its associated electrical circuits. The microprocessor functions, as described in further detail below, to compute wind speed. Disposed within the casing may be an output display 3 and a keypad 24. The display 3 may be of the digital variety and even more specifically of the LCD type. As is typical, the keypad communicates with the microprocessor to input signals from the user. For example, the mode of operation of the anemometer may be controlled with the keypad 24. Such modes may include, among others, calculation and display of a maximum wind speed, an instantaneous wind speed, an average wind speed, ambient temperature, relative humidity, wind chill and/or heat index.

Figure 3:
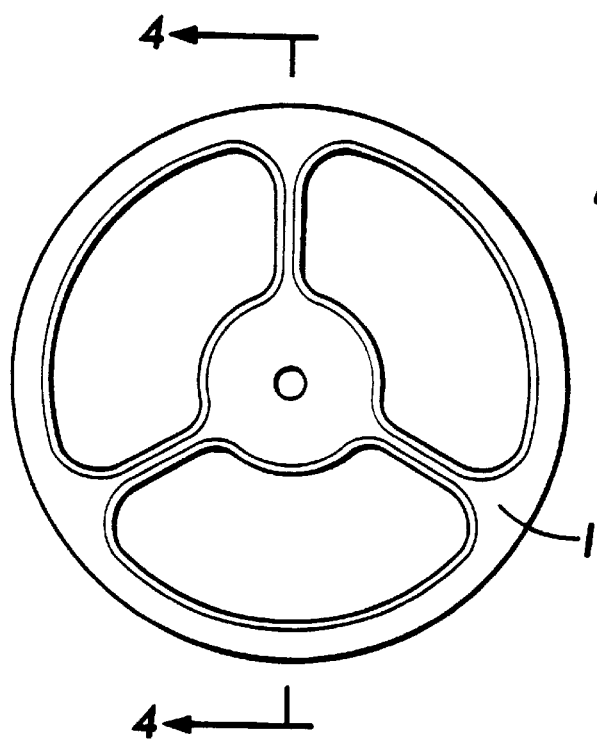
FIG. 3 is a plan view of one component of the preferred embodiment depicted in FIG. 1.

FIGS. 2–4 identify the principal parts of the impeller assembly 1. These components preferably include a first cage 5, a second cage 6, a rotatably mounted impeller 7, two V-jewel bearings 8, a shaft 9, and a magnet 10. In a preferred embodiment, the shaft 9 is preferably constructed from hardened steel. Additionally, the magnet 10 and the impeller 7 are mounted on the shaft 9. They may be press fit onto the shaft 9 or attached by other known methods, such as with use of an adhesive. The shaft 9 may have spherical shaped tips 32 at either of its axial ends as is conventional with many shafts supported in jewel bearings.

Disposed within each cage is a bearing 8 upon which either axial end of the shaft 9 is mounted. Preferably, these bearings are jewel bearings with a V-groove 34. The spherical shaped tips 32 of the shaft roll in the V-groove 34 of the bearings to minimize friction between the shaft and the bearings. Bearings of this type are well known in the art. For example, as mentioned above they are produced by Bird Precision of Waltham, Mass. Since the speed of rotation of the shaft 9 is used to convert air speed into an electrical current so that it can be quantified, ideally there would be no friction between the shaft and the bearings. Any friction between these components causes the measured air speed to differ from the actual air speed. Since as is known in the art, the amount of friction between a jewel bearing and the shaft is relatively low, jewel bearings are typically employed to minimize the effects of friction.

As depicted in FIG. 2, disposed within the casing 2 is an inductor 12. The inductor 12 is in electrical communication with the microprocessor. In one preferred embodiment the inductor 12 is a pick up coil. The magnet 10 is preferably cylindrical in shape and magnetized across its diameter. In operation, as depicted schematically in FIG. 9, the impeller 7 rotates in response to airflow. Since the shaft 9 is rotatably mounted in the bearings 8 and attached to the impeller 7, it rotates in relation to the air flow. Moreover, the magnet 10 rotates with the shaft 9. Rotation of the magnet 10 causes a sinusoidal varying voltage to be received by the inductor 12. This induces an electrical current in the inductor 12 that is transmitted by electrical conductors to the microprocessor. Prior to being received by the microprocessor, the current may be amplified by a conventional amplifier. After receiving the output of the amplifier, the microprocessor computes the air speed. The processor also drives a digital display 3, allowing the user to read the wind speed. The details of the amplifier, processor and display units will be familiar to anyone skilled in the art.

Since the magnet rotates in relation to the wind speed, the variation in the magnetic field produced by the rotation of the magnet is indicative of the wind speed. The rotation of the magnet produces a sinusoidal varying voltage signal that is received by the circuitry within the casing that is coupled to the microprocessor. This voltage signal has a frequency that is equal to or proportional to the rotation rate of the magnet caused by the wind. This electrical signal is sent to an amplifier that converts the sinusoidal signal to a square wave. This square wave signal is then sent to the microprocessor. Thus, the rotation of the magnet due to the wind causes the magnet to produce an electrical signal that can be sent to the microprocessor and be used to display the wind speed.

The anemometer of the present invention can be manufactured without the use of adjustable jewel bearings and the axial clearance of the bearings can be set without the aid of a skilled manufacturer. In order to accomplish these features, one of the cages, which in the preferred embodiment shown, is the first cage 5, has a plurality of protrusions 14 extending from its mating surface, as is best shown in FIG. 5. Additionally, the other cage, which in the preferred embodiment is the second cage 6, has a plurality of recesses 16 in its mating surface 28, as is also best shown in FIGS. 5 and 8. Although only one protrusion and one recess is shown in these figures, it will be appreciated that the impeller assembly 1 may have a plurality of protrusions and recesses. In a preferred embodiment, the impeller assembly has three protrusions and recesses.

Figure 7:
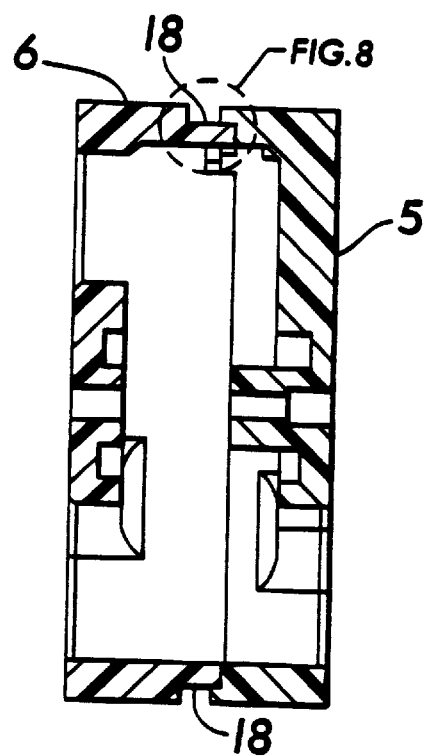
FIG. 7 is a cross sectional view of a component depicted in FIG. 2.
Figure 8:
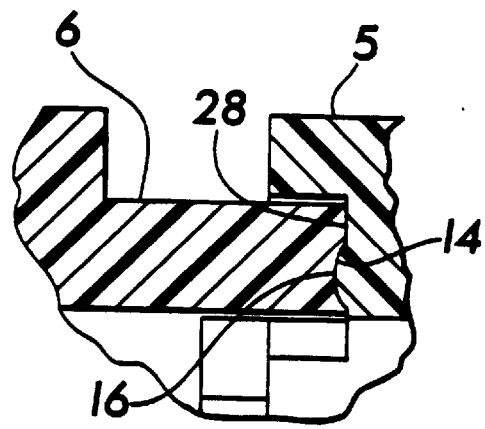
FIG. 8 is an enlarged view of one aspect of the cross section depicted in FIG. 7.

To begin the manufacturing process, a jewel bearing 8 is press fitted into one of the cages, which in the preferred embodiment is the first cage 5. Although the preferred method of attaching the jewel bearings 8 is an interference fit, other known methods of attaching the jewel bearing, such as an adhesive may be used. One axial end of the shaft 9 with the impeller 7 and the magnet 10 mounted around its circumference is then inserted into the attached jewel bearing 8 in the first cage 5. Prior to mounting the shaft 9, the impeller 7 and the magnet 10 are mounted around the circumference of the shaft 9. The first cage 5 is then assembled to the second cage 6, but not yet secured to it. More specifically, the three protrusions 14 extending from the first cage 5 are mated with the three recesses 16 in the second cage 6, as is best seen in FIGS. 7 and 8. The second jewel 8 is then seated on the other axial end of the shaft 9 so that there is essentially zero axial clearance between the ends of the shaft 9 and the bearings 8. Through the use of an adhesive, the second jewel 8 is then rigidly affixed to the second cage 6.

The first and the second cages are then rotated in opposite directions relative to each other. As the cages 5,6 are rotated, the three protrusions 14 come out of their respective recesses 16 and contact the mating surface 28 of the second cage 6. When this occurs, the cages 5,6 are driven apart by the distance "d," which is the distance the protrusions extend from the first cage. The arrangement of the cages at this stage of the assembly is shown in FIGS. 4 and 5. As the cages are separated by the distance "d," it will be appreciated that the shaft 9 becomes separated from the bearings by the distance "d." Since the distance "d" the protrusions 14 extend from the first cage 5 corresponds to the proper axial clearance between the shaft and the bearings, the clearance is set when the cages 5,6 are separated by the protrusions 14. Alternatively stated, the distance "d" that the cages 5,6 are driven apart corresponds to the sum of the axial clearance between each bearing and its respective end of the shaft 9. After the shaft has been separated from the bearings by the distance "d," no further adjustment of the bearings is needed in order to provide the proper axial clearance. Thus, in this invention the axial clearance can be set without the use of an adjustable bearing and a skilled operator is not needed to set the requisite axial clearance.

Following the setting of the axial clearance, the cages 5,6 are affixed to each other by preferably either adhesive bonding or solvent welding. However, other similar means may be employed. An elastomeric material 11 is then placed around the circumference of the assembly. In the preferred embodiment illustrated, the elastomeric material 11 is shaped in the form of an o-ring that runs around a channel 18 between the first cage and the second cage, as best seen in FIGS. 2 and 7. The o-ring may be affixed to the channel 18 with an adhesive. With the o-ring installed, the modular impeller assembly 1 can be inserted into the cavity 17 of the casing 20.

As best seen in FIG. 2, the diameter of the impeller assembly 1 at the point where the o-ring is installed is greater than the diameter of the impeller assembly 1 at other locations. The diameter of the impeller assembly 1 in areas other than where the o-ring is installed is small enough relative to the diameter of the cavity 17, so that, the walls of the cages 5,6 either do not contact the walls of the cavity 17 when the impeller assembly is placed in the cavity 17 or contact the walls only slightly (not enough contact to create an interference fit). However, the diameter of the impeller assembly 1 at the point where the o-ring is installed is larger than the diameter of the cavity 17. Consequently, when the impeller assembly 1 is inserted into the cavity 17, the o-ring is compressed and an interference fit between the impeller assembly 1 and the casing 20 is provided.

In the preferred embodiment depicted in FIG. 2, the casing 20 may have a chamfered edge 26 along the top and the bottom of the cavity 17 for receiving the impeller assembly 1, as best shown in FIG. 2. Additionally, the casing 20 may have a groove, which is preferable a "v" shaped groove 30, running around the cavity 17. As the impeller assembly 1 is inserted, the o-ring is compressed along the sides of the cavity 17. Eventually, upon insertion, the o-ring reaches the groove 30 and is compressed in the groove 30. At this point, the impeller assembly has been inserted into the casing 20. The fit between the impeller assembly 1 and the casing 20 is tight enough, so that, the impeller assembly cannot be removed from the casing unless direct pressure is applied to the impeller assembly. More specifically, if the impeller assembly 1 is dropped or shaken the impeller assembly 1 will not become separated from the casing 20. However, the amount of pressure required to insert and remove the impeller assembly 1 is low enough that the impeller assembly 1 can be inserted and removed by hand without the use of tools.

Because the O-ring is compliant, it provides some mechanical isolation between the casing 2 and the impeller assembly 1. More specifically, the o-ring provides some mechanical isolation, so that, in the event a dynamic force is applied to the casing, for instance if the anemometer is dropped, the dynamic force will be dampened by the o-ring and the force transmitted to the bearings and the shaft will be significantly less. Since as described above jewel bearings are very sensitive and any damage to either the bearings or the shaft can effect the performance of the anemometer, this is one, but certainly not the only significant feature of the invention.

As mentioned above, some prior art vane anemometers have adjustable bearings and even more particularly adjustable jewel bearings. The bearings are adjustable so that the precise axial clearance between each bearing and the respective axial end of the shaft can be maintained. For example, jewel bearings manufactured by Bird Precision of Waltham, Mass. are adjustable. These adjustable bearings are threaded to the anemometer and require a skilled operator to adjust them and set the proper clearance. Since as described above, the axial clearance of the vane anemometer of this invention can be set without a skilled operator having to adjust the bearings to set the proper axial clearance, the anemometer of this invention has a distinct advantage over those of the prior art.

The vane anemometer 15 of this invention may also have the capacity to measure the wind chill of the ambient air. In order to measure the wind chill, the vane anemometer 15 may have a temperature probe 40 and a connector or connectors 42. (The vane anemometer may have a plurality of connectors and the term connector is used herein to refer to one or more connectors.) A first embodiment of this vane anemometer 15 is displayed in FIG. 1. As shown, the temperature probe 40 is external to the casing 20 and extends from the casing 20 into the ambient air. By disposing the temperature probe 40 in the ambient, as opposed to within the casing 20, the temperature probe 40 can obtain equilibrium with the ambient relatively quickly.

The temperature probe 40 may be disposed within an opening 44 defined within the casing 20 of the vane anemometer 15. This opening 44 may be defined by a plurality of walls within the casing 20. In the preferred embodiment shown in FIG. 1, the opening is defined by five walls 46a, 46b, 46c, 46d, 46e. Four of these walls 46a, 46b, 46c and 46d are straight, and one 46e of them is curved. Because the five walls 46a, 46b, 46c, 46d, 46e define an irregular shape (not a standard shape such as a circle or a square), the five walls 46a, 46b, 46c, 46d, 46e form a shape that makes it difficult to place objects into the opening 44 and damage the relatively sensitive temperature probe 40. The temperature probe 40 preferably extends from an aperture 46 in the casing 20, that is disposed at about the midpoint of one of the walls 46b, that defines the opening 44. By placing the temperature probe 40 at the midpoint of one of the walls 46b and by defining the opening 44 in an irregular shape (not a standard shape such as a square or a circle) the likelihood of contacting the probe 40 and damaging the probe 40 by inserting an object into the opening 44 is decreased.

The opening 44 is preferably open to the ambient on at least two sides 48a, 48b, so that ambient air can flow through the opening 44. By exposing the temperature probe 40 to a flow of ambient air, the temperature probe 40 can achieve equilibrium with the ambient relatively quickly, and thus the vane anemometer 15 can determine both the temperature and the wind chill of the ambient relatively quickly. The size of the opening 44 is chosen so as to obtain an adequate amount of air flow to achieve equilibrium with the environment relatively quickly and to minimize the likelihood of damaging the probe 44.

Although FIG. 1 illustrates the shape and size of one opening 44 that may be used in a preferred embodiment of this invention, the invention is not limited to this precise shape, size or the combination of this shape and size. Rather, the shape and size may be selectively chosen so as to obtain an adequate amount of air flow, while at the same time minimizing the likelihood of damage to the temperature probe 40. For example, the shape may be a circle or any other shape that meets these criteria.

Since the temperature probe 40 is external to the casing 20 of the vane anemometer 15, the temperature probe 40 will achieve equilibrium when it is moved from one mass of air at a certain temperature to another mass of air at another temperature. In addition, the temperature probe 40 will respond quicker to changes in temperature in a given mass of air than a probe that is housed within the casing. The vane anemometer 15 also protects the external temperature probe 40 by selecting the proper size and shape of the opening 44 into which the temperature probe 40 extends.

The connector 42 places the temperature probe 40 into electrical communication with the microprocessor. In the embodiment shown in FIG. 1, the connector 42 extends from the casing 20 without any curves. In this embodiment the connector 42 may extend perpendicular or at an angle to a wall 44a of the casing 20 from which it extends.

A second embodiment of this invention is illustrated in FIGS. 10 and 12. In this embodiment, the temperature probe 40 is also coupled to the microprocessor by a connector 42. Similarly, the temperature probe 40 also extends into an opening 44 defined by walls 46a, 46b, 46c, 46d, 46e of the vane anemometer casing 20. The opening 44 is open on two sides to expose the temperature probe 40 to ambient air. The difference between the first embodiment of FIGS. 1 and 11 and the second embodiment of FIGS. 10 and 12 is the length and the shape of the connector 42. As described above, in the embodiment of FIGS. 1 and 11 the connector 42 extends in substantially a straight line from a wall 46b of the casing 20. In contrast, in the embodiment depicted in FIGS. 10 and 12, the connector 42 is wound about itself. By winding the connector 42 about itself, the length of the connector 42 in the second embodiment is longer than that of the first embodiment. Increasing the length of the connector 42 has the advantage of further thermally isolating the temperature probe 40 from the casing 20, so that the temperature probe is less likely to be in thermal equilibrium with the casing 20. This is important because the casing 20 will often be at a higher than ambient temperature. For example, when the vane anemometer 15 is stored in a person's pocket, the casing 20 of the vane anemometer 15 will achieve equilibrium with the temperature of the pocket, which may be quite different from the ambient temperature. If the temperature of the temperature probe is equivalent to the temperature of the casing 20, this can cause the time for the probe 40 to obtain equilibrium with the ambient to increase and therefore, the time to obtain an accurate temperature reading to increase. By increasing the length of the connector 42, the temperature probe 40 is further removed from the casing, so that the temperature probe is less likely to be in thermal equilibrium with the casing 20 when the temperature probe 40 is placed in the ambient. Thus, the temperature of the probe 40 when it is stored is more likely to be closer to ambient temperature, and when the temperature probe 40 is employed, (i.e. removed from the storage location), it will obtain equilibrium with the ambient quicker, thereby enabling the vane anemometer 15 to determine the temperature and the wind chill of the ambient quicker.

The connector 42 as shown in FIGS. 10 and 12 is preferably wound so that it achieves a large length, yet fits within the relatively small opening 44, that is designed to achieve enough air flow to provide an accurate temperature reading and to minimize the likelihood of damage to the temperature probe. The temperature probe may be wound in a variety of ways. The preferred embodiment of FIGS. 10 and 12 is shown by way of illustration and not by way of limitation. In this embodiment, the connector 42 is wrapped in a helical manner to provide two helical loops 48 and is wound back through he loops. The connector 42 may be wound into other shapes and designs, but this design permits the connector to be long enough to provide the requisite thermal isolation from the casing 20, yet short enough so that the connector 42 and the probe 40 can be contained within the opening 44 described above and have the advantage including its size and shape that the opening 44 provides.

Figure 9:
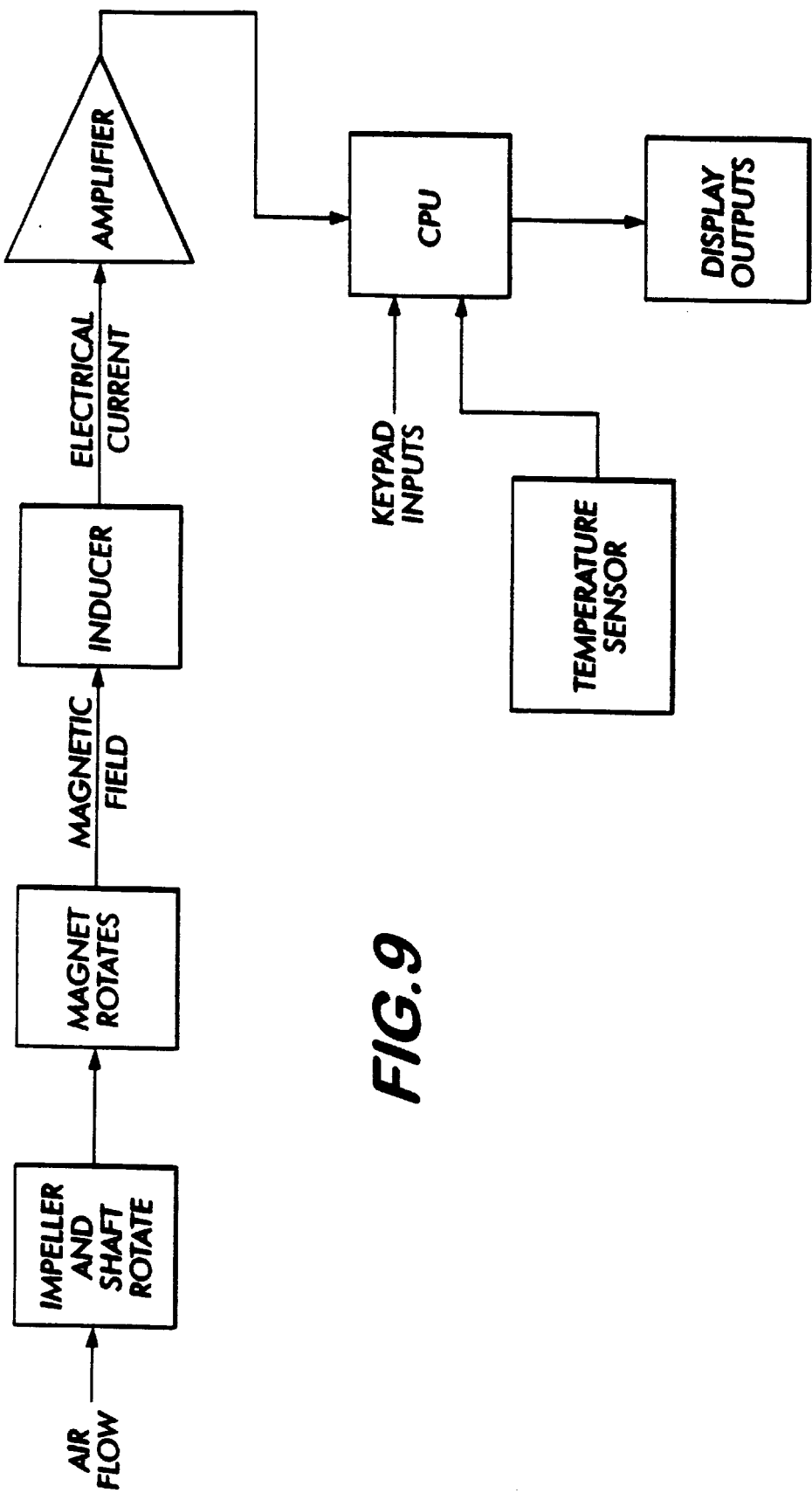
FIG. 9 is a schematic diagram of the anemometer depicted in FIG. 1.

In order to determine the wind speed, the temperature probe 40 inputs the temperature to the microprocessor as is best illustrated in FIG. 9. The temperature probe may be a thermistor manufactured by QTI Inc. of Boise Idaho. The microprocessor calculates the wind chill from the temperature and the wind speed determined from the rotation of the impeller, as described above.

As mentioned above, the vane anemometer 15 may have an output display 3 and a keypad 24. This output display 3 may be used to display the wind chill and the temperature. The keypad 24 may be used to select the desired output, windchill, temperature or wind speed.

In summary, by providing a vane anemometer 15 with an external temperature probe 40, the vane anemometer 15 can obtain equilibrium with the ambient relatively quickly when the vane anemometer is placed in the ambient. In order to protect the temperature probe 40 from damage, the temperature probe 40 may extend into an opening 44 defined within the casing 20 of the vane anemometer 15. The opening 44 is preferably open on two sides so that the air flow is great enough to relatively quickly and accurately determine the temperature of the ambient. In addition, the opening 44 is preferably of a size and shape that minimizes the likelihood of damage to the temperature probe 40. The electrical connector 42 that couples the temperature probe 40 to the microprocessor may be wound about itself within the opening to increase the length of the connector 42. By increasing the length of the connector 42, the temperature probe 40 is further thermally isolated from the casing 20 so that the temperature probe 40 can obtain equilibrium with the ambient relatively quickly.

As shown in FIG. 1, the vane anemometer of this invention may further include a humidity sensor 50 that can be used to measure a variety of environmental parameters, such as relative humidity and heat index. In a preferred embodiment, the humidity sensor 50 is a "Minicap 2" available from Panametrics of Waltham, Mass. that measures relative humidity. This example is provided by way of illustration and not by way of limitation; other appropriate sensors can be used. The humidity sensor 50 is in electrical communication with the microprocessor, so that the microprocessor can determine relative humidity in response to the humidity sensor 50 and heat index in response to the humidity sensor 50 and the temperature probe 40. Electrical leads 52 may be used to electrically couple the humidity sensor 50 to the microprocessor.

In a preferred embodiment, the humidity sensor 50 includes a permeable dielectric material that can absorb water in proportion to the relative humidity of the ambient air. By monitoring the amount of water absorbed, the relative humidity can be determined. One way to do this is be monitoring the capacitance of the dielectric material, which changes with the amount of water absorbed. An electrical signal can be produced from the dielectric material that has a value that is indicative of its capacitance, and thus the relative humidity, and sent to the microprocessor. From this electrical signal, the microprocessor can then determine the relative humidity.

One way to measure the capacitance of the permeable dielectric material, and therefore the relative humidity, is to measure a change in the frequency of oscillation of an oscillator that is electrically coupled to the dielectric material and disposed within the sensor. By being electrically coupled to the dielectric material, the frequency of oscillation will change in proportion to the change in capacitance of the dielectric material. This change in frequency can then be electrically communicated to the microprocessor to determine the relative humidity.

Another way to determine the capacitance of the permeable dielectric material, and therefore the relative humidity, is by measuring the time required to electrically charge the material. The time required to charge the material is a function of the capacitance of the material. Thus, by measuring the time required to charge the dielectric material and communicating this to the microprocessor, the relative humidity can be determined.

Although the humidity sensor 50 is not used to measure temperature, its measurement of the relative humidity is strongly effected by the temperature of the humidity sensor 50. For example, if the humidity sensor 50 is of the type described above, the humidity sensor 50 determines relative humidity by determining the amount of water absorbed into a dielectric material of a capacitor. Since the ability of the dielectric material to absorb water is a function of the temperature of the dielectric material, the measurement of relative humidity is dependent upon the temperature of the humidity sensor 50. At higher temperatures less water can be absorbed, and at lower temperatures more water can be absorbed. Therefore, if the humidity sensor 50 were significantly warmer than the ambient, less water would be absorbed and the sensor would respond as through the relative humidity were in fact lower. So, it is important that the humidity sensor 50 obtains thermal equilibrium with its environment relatively quickly when moving from one thermal mass to another. This is similar to the importance of the temperature probe achieving thermal equilibrium relatively quickly. For instance, if the portable vane anemometer 15 is stored in a pocket, the casing 20 is likely to be approximately at the temperature of the pocket, which in many instances will be much different from ambient. If the anemometer 15 is then moved from the pocket to the environment, the humidity sensor 50 must reach thermal equilibrium with the environment in order to obtain an accurate humidity reading.

If the humidity sensor 50 is not thermally isolated from the casing 20, the time to obtain an accurate reading when moving from one thermal mass to another will significantly increase because the entire casing 20 must be brought into thermal equilibrium with the second thermal mass. Since in many instances casings of anemometers are constructed from plastic or another relatively non-thermally conductive material, this time to reach thermal equilibrium can be significant.

In order to achieve this, the humidity sensor 50, like the temperature probe, is thermally isolated from the casing 20, so that the humidity sensor 50 can reach equilibrium with the environment relatively quickly when moving from one thermal mass to another. There are a number of ways to thermally isolate the humidity sensor 50 from the casing 20. In the embodiment shown in FIG. 1, the leads 52 coupling the humidity sensor 50 to the microprocessor are manufactured from a metal alloy that has a relatively low thermal conductivity. One example of such a material is an ASTM F15 alloy. Further, the leads 52 are of a length that is sufficient to thermally isolate the humidity sensor 50 from the casing 20. Of course, either or both of these techniques can be used to thermally isolate the humidity sensor 50 from the casing 20.

Although it is important to thermally isolate the humidity sensor 50 from the casing 20, it will be appreciated that the humidity sensor 50 is relatively fragile and can be damaged relatively easily through mechanical shock or an applied load. In order to protect the humidity sensor 50, while at the same time providing thermal isolation, the humidity sensor 50 is disposed within a relatively small opening 54 in the casing. This opening 54 is small enough to prevent most objects from being inserted into the opening 54, but large enough to permit a representative amount of air flow to contact the humidity sensor 50. By preventing most objects from entering the opening 54, the humidity sensor 50 is protected from mechanical damage from the insertion of most objects through the opening 54 and mechanical damage from contacting objects that would occur if the humidity sensor 50 extended from a periphery of the casing 20.

In a preferred embodiment, the opening 54 is defined by five walls, 55a, 55b, 55c, 55d, and 55e. Four of these walls 55a, 55b, 55c and 55 are straight, and one 55e of them is curved. Because the five walls 55a, 55b, 55c, 55d, 55e define an irregular shape (not a standard shape such as a circle or a square), the five walls 55a, 55b, 55c, 55d, 55e form a shape that makes it difficult to place objects into the opening 44 and damage the relatively sensitive temperature probe 40. However, a variety of shapes may be used to define the opening and less than five walls may be used, for example the shape may be a square or a rectangle. The humidity sensor 50 preferably extends from an aperture 56 in the casing 20, that is disposed at about the midpoint of one of the walls 55a, that defines the opening 55. By placing the humidity sensor 50 at the midpoint of one of the walls 55a and by defining the opening 55 in an irregular shape (not a standard shape such as a square or a circle) the likelihood of contacting the humidity sensor 50 and damaging the humidity sensor 50 by inserting an object into the opening 55 is decreased.

Although FIG. 1 illustrates the shape and size of one opening 54 that may be used in a preferred embodiment of this invention, the invention is not limited to this precise shape, size or the combination of this shape and size. Rather, the shape and size may be selectively chosen so as to obtain an adequate amount of air flow, while at the same time minimizing the likelihood of damage to the humidity sensor 50. The shape and size are chosen to be large enough, so as to provide the requisite air flow and small enough, so as to provide mechanical protection for the sensor.

In addition to providing openings for the temperature probe 40 and the humidity sensor 50, the openings 44, 54 also provide a pressure relief function. The pressure relief is needed because of the impeller assembly. As the impeller turns an area of low pressure and an area of high pressure on either side of the casing 20 are created. The openings function to relieve this pressure differential. Without the openings 44, 54, the air flow through the impeller would not be a true reading of ambient wind speed, because the pressure differential would effect the air flow through the impeller.

Heat Index can be determined in a number of ways. In one embodiment of this invention, the heat index is calculated as a function of relative humidity and temperature. For any pair of values of relative humidity and temperature there is a corresponding numeric heat index value. The heat index is published by the National Whether Service (NTW). Each heat index value and its corresponding relative humidity and temperature are stored in a memory that is accessible by the microprocessor. Upon sensing the relative humidity and the temperature in response to the humidity sensor 50 and temperature probe 40 respectively, the microprocessor can access the memory to determine the corresponding heat index value. Since as described above the measurement of relative humidity and temperature are both temperature sensitive measurements and the heat index is a function of both of these measurements, the measurement of heat index is itself temperature dependent. Thus, in order to quickly obtain a relatively accurate heat index measurement when moving from one thermal mass to another, it is important that the humidity sensor 50 and the temperature probe 40 are thermally isolated from the casing 20. This embodiment for calculating heat index is provided by way of example and not be way of limitation.

Both the heat index and the humidity can then be presented on the display 3. In a preferred embodiment, the key pad 24 can be used to select either the heat index or the humidity. Even more preferably, the key pad 24 can be used to select either temperature, wind chill, humidity or heat index for viewing on the display. Alternatively, any combination of these parameters can be selected with the keypad 24 and viewed together on the display 3.

This invention is not limited to a vane anemometer 15 that has either a temperature probe 40 and/or a humidity sensor 50. Rather, the invention includes a portable hand held vane anemometer 15 that has a thermally isolated sensor for measuring environmental parameters and that can be used to measure a temperature dependent environmental parameter or a parameter whose measurement is temperature dependent relatively quickly when moving from one thermal mass to another thermal mass. As described above, in order to register a relatively quick change in environmental parameters, it is imperative that the sensor is external to the casing 20 and thermally isolated from the casing 20, so that the sensor does not have to wait for the entire casing 20 to reach the temperature of a second thermal mass before registering a true indication of the parameter sensed. Further, since almost any sensor to be used in a hand held anemometer 15 is going to be relatively fragile, it is imperative that the sensor be protected from accidental contact and mechanical shock.

In order to achieve this, the portable hand-held vane anemometer 15 of this invention includes an opening, such as that the opening 44, disposed in the casing 20 and a sensor disposed in the opening. As described above, the opening is shaped and sized, so as to permit an adequate amount of air flow through the opening. This ensures that the sensor will obtain a true indication of the parameter it is measuring. Without adequate airflow, the sensor may measure a parameter of an isolated air mass rather than the parameter of a desired larger thermal mass. Moreover, the opening must be small enough to protect the sensor from damage. An example of such an opening that balances these competing considerations is shown by the openings of FIG. 1. However, the opening may be any of a variety of shapes, including conventional shapes and irregular shapes. Furthermore, the humidity sensor 50 and the temperature probe 40 may be disposed within a single opening that is appropriately shaped and sited.

It is also important that the sensor is thermally isolated. As described above, thermal isolation can occur by either designing the connector that couples the sensor to the microprocessor to be of sufficient length to thermally isolate the sensor or by selecting a material for the conductor that is of low thermal conductivity. Alternatively, a combination of these two may be used.

Although the vane anemometer of this invention includes vane anemometers that have a modular impeller assembly, the vane anemometer of this invention also includes hand held anemometers that do not necessarily have a modular impeller assembly, but have either or both a temperature sensor and a humidity sensor that can react relatively quickly when moving from one thermal mass to another thermal mass. In this regard, this invention includes portable vane anemometers that have either or both a thermally isolated temperature probe or humidity sensor.

Although a certain embodiment of the present invention has been illustrated above, that embodiment is for purposes of illustration only and is not meant to limit the scope of the present invention. Upon review of the forgoing specification those of ordinary skill will immediately realize numerous adaptations and modifications of the disclosed system. Therefore, in order to ascertain the scope of the present invention, attention is directed to the appended claims.

What is claimed:

1. A portable hand-held vane anemometer that can determine wind speed, temperature, wind chill and humidity, comprising:
   a casing that encloses a microprocessor that is adaptable to determine wind speed, wind chill, air temperature and humidity;
   a temperature probe that is coupled to the casing and that is external to the casing, the temperature probe being in electrical communication with the microprocessor, so that the microprocessor can determine the temperature of the air;
   a humidity sensor that is coupled to the casing and that is external to the casing, the humidity sensor being in electrical communication with the microprocessor, so that the microprocessor can determine humidity; and
   an impeller and a magnet mounted on a rotatable shaft, such that wind causes rotation of the impeller, the magnet and the shaft, said rotation of the magnet producing an electrical signal that is proportional to the wind speed, and the electrical signal being receivable by said microprocessor, so that the microprocessor can calculate the wind speed in response to the electrical signal and the wind chill in response to the electrical signal and the temperature probe.

2. The vane anemometer of claim 1, further comprising a first opening defined within the casing and in which the temperature probe is disposed, the first opening being sized large enough to provide a sufficient amount of air flow to permit the temperature probe to measure an accurate temperature of the ambient and small enough to protect the temperature probe from mechanical damage.

3. The vane anemometer of claim 1, further comprising an opening defined within the casing and in which the humidity sensor is disposed, the opening being sized large enough to provide a sufficient amount of air flow to permit the humidity sensor to measure an accurate humidity of the ambient and small enough to protect the humidity sensor from mechanical damage.

4. The vane anemometer of claim 2, further comprising a second opening defined within the casing and in which the humidity sensor is disposed, the second opening being sized large enough to provide a sufficient amount of air flow to permit the humidity sensor to measure an accurate humidity of the ambient and small enough to protect the humidity sensor from mechanical damage.

5. The vane anemometer of claim 1, wherein the impeller, the shaft and the magnet are disposed within a modular impeller assembly that can be removably inserted into a cavity disposed in the casing.

6. The vane anemometer of claim 5, wherein the modular impeller assembly can be inserted into and removed from the casing without the aid of tools.

7. The vane anemometer of claim 5, wherein the modular impeller assembly further comprises a first cage sealed to a second cage and the shaft is rotatably mounted within the first and second cages.

8. The vane anemometer of claim 5, wherein the casing further comprises a groove, disposed within a portion of the casing that defines the cavity, for receiving an elastomeric material running around the periphery of the impeller assembly.

9. The vane anemometer of claim 5, wherein the impeller assembly further comprises a first and a second cage, the first cage having a plurality of protrusions separating the first cage from the second cage by a length of the protrusions and a sum of a first axial clearance between a first bearing and a first end of the shaft and a second axial clearance between a second bearing and a second end of the shaft approximately equals the length of the protrusions.

10. The vane anemometer of claim 1, wherein the temperature probe is thermally isolated from the casing by an electrical connector that extends from the temperature probe and that is of sufficient length to thermally isolate the temperature probe from the casing.

11. The vane anemometer of claim 1, wherein the humidity sensor is thermally isolated from the casing by an electrical connector that extends from the humidity sensor and that is of sufficient length to thermally isolate the humidity sensor from the casing.

12. A portable hand-held vane anemometer that can determine wind speed and humidity, comprising:
   a casing that encloses a microprocessor that is adaptable to determine wind speed and humidity;
   a humidity sensor that is coupled to the casing and that is external to the casing, the humidity sensor being in electrical communication with the microprocessor, so that the microprocessor can determine humidity; and
   an impeller and a magnet mounted on a rotatable shaft, such that wind causes rotation of the impeller, the magnet and the shaft, said rotation of the magnet producing an electrical signal proportional to the wind speed, and the electrical signal being receivable by said microprocessor, so that the microprocessor can calculate the wind speed in response to the electrical signal.

13. The vane anemometer of claim 12, wherein the humidity sensor is thermally isolated from the casing by an electrical connector that extends from the humidity sensor and that is of sufficient length to thermally isolate the humidity sensor from the casing.

14. The vane anemometer of claim 12, further comprising an opening defined within the casing and in which the humidity sensor is disposed, the opening being sized large enough to provide a sufficient amount of air flow to permit the humidity sensor to measure an accurate humidity of the ambient and small enough to protect the humidity sensor from mechanical damage.

15. The vane anemometer of claim 12, further comprising an opening defined within the casing and in which the humidity sensor is disposed, the humidity sensor being thermally isolated from the casing by an electrical connector that extends from the sensor and that is of sufficient length to thermally isolate the humidity sensor from the casing.

16. The vane anemometer of claim 12, further comprising a temperature probe that is coupled to the casing and that is external to the casing, the temperature probe being in electrical communication with the microprocessor, so that the microprocessor can determine the temperature of the air.

17. The vane anemometer of claim 16, wherein the microprocessor can further determine wind chill in response to the temperature probe and the electrical signal generated by the impeller and the magnet.

18. The vane anemometer of claim 16, further comprising a first opening defined within the casing and in which the temperature probe is disposed, the first opening being sized large enough to provide a sufficient amount of air flow to permit the temperature probe to measure an accurate temperature of the ambient and small enough to protect the temperature probe from mechanical damage.

19. The vane anemometer of claim 18, further comprising a second opening defined within the casing and in which the humidity sensor is disposed, the second opening being sized large enough to provide a sufficient amount of air flow to permit the humidity sensor to measure an accurate humidity of the ambient and small enough to protect the humidity sensor from mechanical damage.

20. The vane anemometer of claim 16, wherein the temperature probe is thermally isolated from the casing by an electrical connector that extends from the temperature probe and is of sufficient length to thermally isolate the temperature probe from the casing.

21. The vane anemometer of claim 12, wherein the impeller, the magnet and the shaft are disposed within an impeller assembly that comprises a modular impeller assembly that can be removably inserted into a cavity disposed in the casing.

22. The vane anemometer of claim 21, wherein the modular impeller assembly can be inserted into and removed from the casing without the aid of tools.

23. The vane anemometer of claim 21, wherein the modular impeller assembly further comprises a first cage sealed to a second cage and the shaft is rotatably mounted within the first and second cages.

24. The vane anemometer of claim 21, wherein the casing further comprises a groove, disposed within a portion of the casing that defines the cavity, for receiving an elastomeric material running around the periphery of the impeller assembly.

25. The vane anemometer of claim 21, wherein the impeller assembly further comprises a first and a second cage, the first cage having a plurality of protrusions separating the first cage from the second cage by a length of the protrusions and a sum of a first axial clearance between a first bearing and a first end of the shaft and a second axial clearance between a second bearing and a second end of the shaft approximately equals the length of the protrusions.

26. A portable hand-held vane anemometer that can be used to measure a first temperature dependent environmental parameter relatively quickly, when being moved from a first thermal mass to a second thermal mass, comprising:
 a casing that encloses a microprocessor that is adaptable to determine the first environmental parameter and calculate wind speed, the casing having a first opening defined within the casing through which air can flow;
 a first sensor that is coupled to the casing and that extends into the first opening, the first sensor being for sensing the temperature dependent environmental parameter and being in electrical communication with the microprocessor, so that the microprocessor can determine the first environmental parameter in response to the first sensor;
 a first electrical conductor, connected to the first sensor and in electrical communication with the microprocessor, the first electrical conductor being disposed in the opening, the first electrical conductor being of a length that is sufficient to thermally isolate the first sensor from the casing, so that the first sensor can sense the first environmental parameter of the second thermal mass relatively quickly when the vane anemometer is moved from the first thermal mass to the second thermal mass; and
 an impeller and a magnet mounted on a rotatable shaft, such that wind causes rotation of the impeller, the magnet and the shaft, said rotation of the magnet producing an electrical signal proportional to the wind speed and the electrical signal being receivable by said microprocessor so that the microprocessor can calculate the wind speed in response to the electrical signal.

27. The vane anemometer of claim 26, wherein the first opening is sized large enough to provide a sufficient amount of air flow to permit the first sensor to measure the first environmental parameter of the second thermal mass relatively quickly and accurately and small enough to protect the first sensor from mechanical damage.

28. The vane anemometer of claim 26, wherein the first sensor is a humidity sensor and the first environmental parameter is humidity.

29. The vane anemometer of claim 26, wherein the first sensor is a temperature sensor and the first environmental parameter is temperature.

30. The vane anemometer of claim 29, wherein the first environmental parameter further comprises wind chill and the microprocessor determines the wind chill in response to the temperature sensor and the electrical signal.

31. The vane anemometer of claim 26, further comprising a second sensor, disposed in a second opening defined within the casing, the second sensor being coupled to the casing and extending into the second opening, the second sensor being for sensing a second temperature dependent environmental parameter and being in electrical communication with the microprocessor, so that the microprocessor can determine the second environmental parameter in response to the second sensor.

32. The vane anemometer of claim 31, further comprising a second electrical conductor, connected to the second sensor and in electrical communication with the microprocessor, the second electrical conductor being disposed in the second opening, the second electrical conductor being of a length that is sufficient to thermally isolate the second sensor from the casing, so that the second sensor can sense the second environmental parameter of the second thermal mass relatively quickly when the vane anemometer is moved from the first thermal mass to the second thermal mass.

33. The vane anemometer of claim 31, wherein the second opening is sized large enough to provide a sufficient amount of air flow to permit the second sensor to accurately measure the second environmental parameter of the ambient and small enough to protect the second sensor from mechanical damage.

34. The vane anemometer of claim 31, wherein the first sensor is a humidity sensor and the first environmental parameter is humidity.

35. The vane anemometer of claim 34, wherein the second sensor is a temperature sensor and the second environmental parameter is temperature.

36. The vane anemometer of claim 35, wherein the second environmental parameter further comprises wind chill and the microprocessor determines the wind chill in response to the temperature sensor and the electrical signal.

37. The vane anemometer of claim 26, wherein the impeller, the magnet and the shaft are mounted within a modular impeller assembly that can be removably inserted into a cavity disposed in the casing.

38. The vane anemometer of claim 37, wherein the modular impeller assembly can be inserted into and removed from the casing without the aid of tools.

39. The vane anemometer of claim 37, wherein the modular impeller assembly further comprises a first cage sealed to a second cage and the shaft is rotatably mounted within the first and second cages.

40. The vane anemometer of claim 37, wherein the casing further comprises a groove, disposed within a portion of the casing that defines the cavity, for receiving an elastomeric material running around the periphery of the impeller assembly.

41. The vane anemometer of claim 37, wherein the impeller assembly further comprises a first and a second cage, the first cage having a plurality of protrusions separating the first cage from the second cage by a length of the protrusions and a sum of a first axial clearance between a first bearing and a first end of the shaft and a second axial clearance between a second bearing and a second end of the shaft approximately equals the length of the protrusions.

* * * * *